US012631470B2

(12) United States Patent
Miyakawa et al.

(10) Patent No.: US 12,631,470 B2
(45) Date of Patent: May 19, 2026

(54) INFORMATION PROCESSING APPARATUS, INFORMATION PROCESSING METHOD, MOVING BODY AND STORAGE MEDIUM

(71) Applicant: CANON KABUSHIKI KAISHA, Tokyo (JP)

(72) Inventors: Takumi Miyakawa, Kanagawa (JP); Masakazu Fujiki, Kanagawa (JP); Takatomo Kawai, Kanagawa (JP); Makoto Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 18/093,393

(22) Filed: Jan. 5, 2023

(65) Prior Publication Data

US 2023/0243667 A1     Aug. 3, 2023

(30) Foreign Application Priority Data

Jan. 28, 2022     (JP) ................................. 2022-011627

(51) Int. Cl.
G01C 21/00          (2006.01)
G06T 11/60          (2026.01)

(52) U.S. Cl.
CPC .......... G01C 21/3859 (2020.08); G06T 11/60 (2013.01)

(58) Field of Classification Search
CPC ............................ G01C 21/3859; G06T 11/60
See application file for complete search history.

(56) References Cited

U.S. PATENT DOCUMENTS

| | | | |
|---|---|---|---|
| 10,108,199 B2 | 10/2018 | Nakajima | |
| 11,185,977 B2 | 11/2021 | Kobayashi | |
| 11,391,578 B2 * | 7/2022 | Zeng ....................... | G01C 21/32 |
| 11,493,930 B2 * | 11/2022 | Holz ................... | G01C 21/3848 |
| 2010/0332119 A1 * | 12/2010 | Geelen ............... | G01C 21/3664 |
| | | | 701/533 |
| 2017/0168498 A1 * | 6/2017 | Nakajima .......... | G01C 21/3837 |
| 2018/0216942 A1 * | 8/2018 | Wang ....................... | G01S 17/89 |
| 2018/0253630 A1 * | 9/2018 | Tamer .................... | H04N 23/40 |

(Continued)

FOREIGN PATENT DOCUMENTS

| | | |
|---|---|---|
| JP | 2017-107425 A | 6/2017 |
| JP | 2019-016089 A | 1/2019 |

(Continued)

OTHER PUBLICATIONS

Susan—A New Approach to Low Level Image Processing, International Journal of Computer Vision 23(1), 45-78 (1997).

(Continued)

*Primary Examiner* — Jelani A Smith
*Assistant Examiner* — Gabriel Anfinrud
(74) *Attorney, Agent, or Firm* — Venable LLP

(57)          ABSTRACT

An information processing apparatus comprising a memory storing instructions; and a processor executing the instructions causing the information processing apparatus to acquire sensor information from a sensor mounted on a moving body, generate map data based on the sensor information, calculate a use appropriateness degree of the map data based on at least one of the sensor information and the map data, and determine whether or not to use the map data in a position and/or orientation measurement of the moving body that is based on the use appropriateness degree.

21 Claims, 7 Drawing Sheets

(56)                    References Cited

U.S. PATENT DOCUMENTS

| | | | |
|---|---|---|---|
| 2019/0011929 A1 | 1/2019 | Maeno | |
| 2019/0227545 A1 | 7/2019 | Yoo et al. | |
| 2019/0317239 A1* | 10/2019 | Olsson | G01C 21/3852 |
| 2020/0104290 A1 | 4/2020 | Sakaguchi et al. | |
| 2020/0202600 A1* | 6/2020 | Chang | G09G 5/14 |
| 2021/0140771 A1 | 5/2021 | Igarashi | |
| 2021/0341308 A1* | 11/2021 | Ivanov | G01C 21/3837 |
| 2022/0074762 A1* | 3/2022 | Artes | B25J 9/1664 |
| 2023/0030791 A1 | 2/2023 | Miyatani | |
| 2023/0072508 A1 | 3/2023 | Yamamoto | |

FOREIGN PATENT DOCUMENTS

| | | |
|---|---|---|
| JP | 2020-056917 A | 4/2020 |
| JP | 2020-153956 A | 9/2020 |
| JP | 2021-018640 A | 2/2021 |
| JP | 2021-076475 A | 5/2021 |

OTHER PUBLICATIONS

Nov. 4, 2025 Office Action in Japanese Patent Application No. 2022-011627 (with English tranlsation).

* cited by examiner

FIG. 1

INFORMATION PROCESSING APPARATUS, INFORMATION PROCESSING METHOD, MOVING BODY AND STORAGE MEDIUM

BACKGROUND OF THE INVENTION

Field of the Invention

The present invention relates to an information processing apparatus, a method of controlling an information processing apparatus, a moving body, and a storage medium.

Description of the Related Art

Autonomous driving vehicles such as automated guided vehicles (hereinafter, referred to as "AGVs") are used in factories and logistics warehouses. In addition, simultaneous localization and mapping ("SLAM") is used as a method for estimating the position and orientation of such autonomous driving vehicles. SLAM simultaneously and in parallel performs a process of generating a map that is used in position and/or orientation measurement, and a process of position and/or orientation measurement that used the map.

The map information that is used in estimating the position and orientation of an autonomous driving vehicle of this type is operated to generate and update a new map in accordance with a change in the traveling route layout. In contrast, a determination means has been necessary to determine which of the newly updated map and a conventionally used map should be used for the next traveling.

Japanese Patent Laid-Open No. 2017-107425 proposes a method for determining a map as a storage target in a case in which the map accuracy is within a predetermined error. In addition, in S. M. Smith and J. M. Brady, "SUSAN—a new approach to low level image processing," Int'l J Computer Vision, vol. 23, no. 1, pp. 45-78, 1997, discloses a processing method for generating environmental map data by moving a moving body on which a sensor is mounted.

However, the method of Japanese Patent Laid-Open No. 2017-107425 does not disclose a method for identifying a map with the highest accuracy during cyclic traveling. In this case, there is a problem in that it is difficult to maintain the accuracy of the measurement of the position and/or orientation of the moving body in a case in which the map is updated.

SUMMARY OF THE INVENTION

The present invention was made in view of the above-described problem, and provides an information processing apparatus capable of maintaining the accuracy of position and/or orientation measurement of a moving body in a case in which a map is updated.

To achieve the above-described object, an information processing apparatus of the present invention is an information processing apparatus comprising a memory storing instructions and a processor executing the instructions causing the information processing apparatus to acquire sensor information from a sensor mounted on a moving body, generate map data based on the sensor information, calculate a use appropriateness degree of the map data based on at least one of the sensor information and the map data, and determine whether or not to use the map data in a position and/or orientation measurement of the moving body that is based on the use appropriateness degree.

Further features of the present invention will become apparent from the following description of exemplary embodiments (with reference to the attached drawings).

BRIEF DESCRIPTION OF THE DRAWINGS

FIG. 1 is a hardware configuration diagram of an information processing apparatus.

DESCRIPTION OF THE EMBODIMENTS

Figure 2:
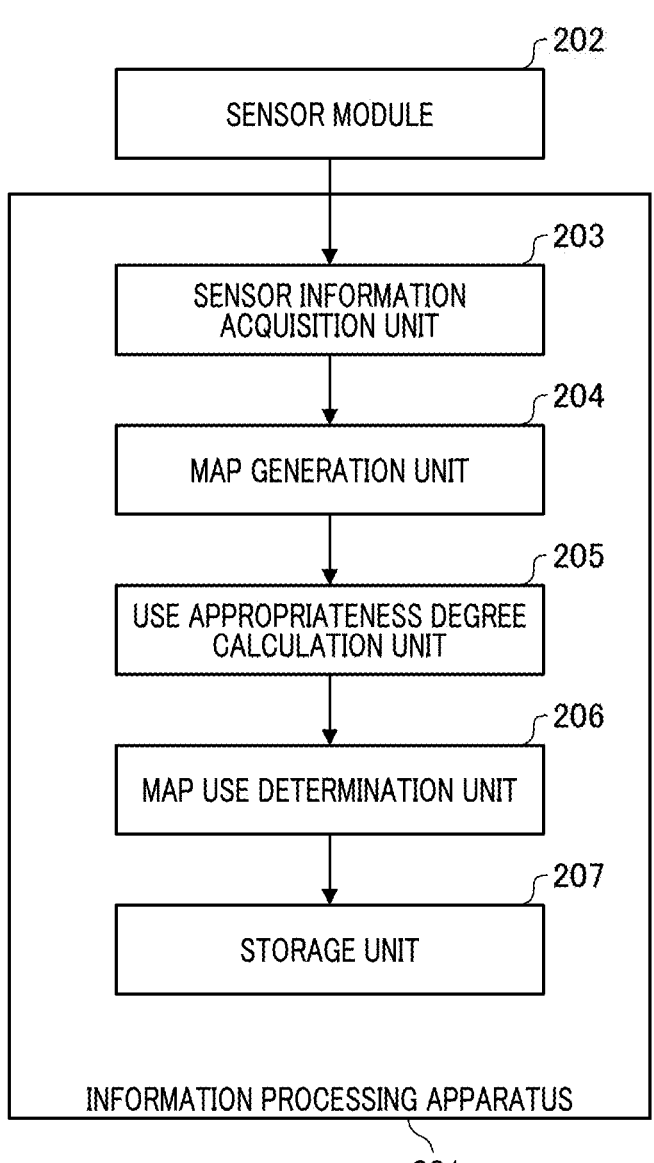
FIG. 2 is a functional configuration diagram of an information processing system.

Hereinafter, with reference to the accompanying drawings, embodiments of the present invention will be described using embodiments. Note that the following embodiments are not intended to limit the claims of the present invention, and not all of the combinations of the aspects that are explained in the following embodiments are necessarily required for the means to solve the problems according to the present invention.

First Embodiment

In the first embodiment, a case in which the method of the present embodiment is applied to an information processing apparatus configured to generate map information based on an image that is captured by a camera that is mounted on an AGV will be described. However, the technical scope of the present invention is not limited to the present embodiment.
(Principle)

An information processing apparatus according to the present embodiment generates map information for position and/or orientation measurement of a moving body by using SLAM technology based on an image that is captured by a camera mounted on a moving body. A moving body system according to the present embodiment calculates the position and orientation of a moving body based on map information, and based on the results of that calculation, the moving body is operated so as to repeatedly pass along a predetermined route. By means of the SLAM mechanism, the moving body system updates the map information for each repeated pass.

Here, the information processing apparatus according to the present embodiment calculates the appropriateness degree of the updated map, stores the updated map as a "master map" in a case in which the appropriateness degree of the map is improved over that of a map that was generated in the past, and uses the updated map at the time of the next and subsequent passes. The map information according to the present embodiment includes spatial arrangement information of feature points detected from an image, and to maintain a higher accuracy of the position and orientation calculation, the appropriateness degree of the map is determined based on the number of feature points.

(Hardware Configuration)

Figure 1:
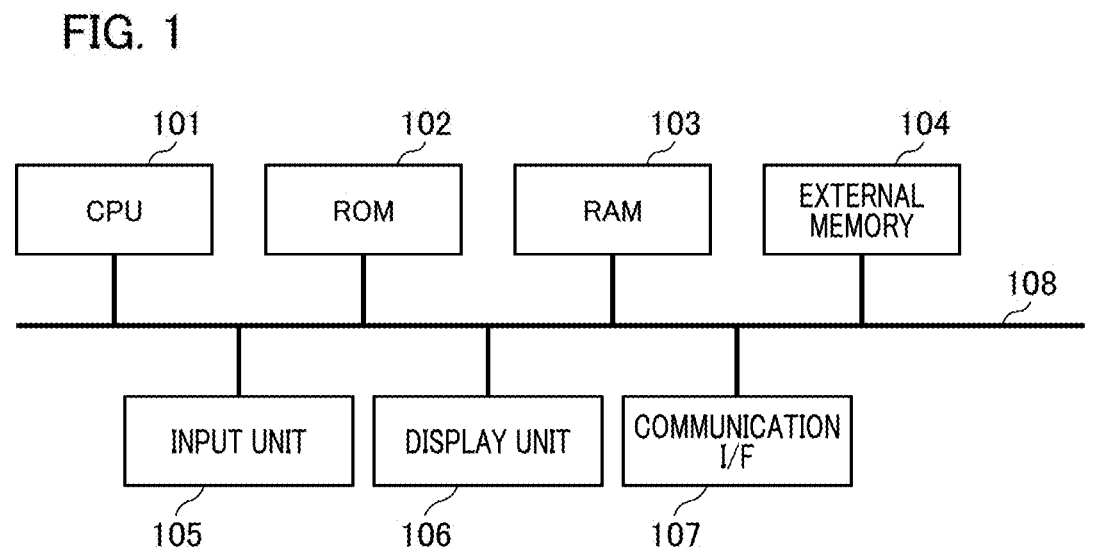

FIG. 1 is a hardware configuration diagram of an information processing apparatus. In FIG. 1, a CPU 101 performs control of various devices that are connected to a system bus 108. A ROM 102 records a BIOS program or a boot program. A RAM 103 is used as a main memory of the CPU 101. An external memory 104 stores a program to be processed by the CPU 101. An input unit 105 is a keyboard, a mouse, or a robot controller, and performs processing related to input of information and the like from a user. A display unit 106 outputs, on a display apparatus, a computation result in accordance with an instruction from the CPU 101. Note that the display apparatus may be any kind of a device such as a liquid crystal display device, a projector, or the like. A communication I/F (interface) 107 performs information communication with various external apparatuses such as an external sensor module.

(Functional Configuration)

FIG. 2 is a functional configuration diagram of an information processing system. A functional configuration of the basic information processing system of the present embodiment will be explained with reference to FIG. 2. An information processing apparatus 201 is the information processing apparatus that was explained with reference to FIG. 1. A sensor module 202 is a stereo camera, which simultaneously captures two images having parallax. A sensor information acquisition unit 203 acquires sensor information acquired by the sensor, and in the present embodiment, acquires a sensing result from the sensor module 202. A map generation unit 204 generates map data based on the sensing result and the self-position estimation result that was acquired via the sensor information acquisition unit 203. A use appropriateness degree calculation unit 205 calculates the use appropriateness degree of the map that was generated by the map generation unit 204 and holds the calculated use appropriateness degree in the RAM 103. A map use determination unit 206 determines whether to use the map generated by the map generation unit 204 for position and/or orientation measurement by using the use appropriateness degree, which is the calculation result of the use appropriateness degree calculation unit 205. Specifically, the map use determination unit 206 determines whether the map that was generated by the map generation unit 204 is used in place of the current master map, or whether the current master map is to be continuously used. A storage unit 207 stores the master map determined by the map use determination unit 206 in the external memory 104. In the present embodiment, the current master map is an example of pre-stored first map data in the information processing apparatus 201. In addition, the map generated by the map generation unit 204 is an example of second map data in which first sensor information was acquired based on the master map, and was generated based on the first sensor information.

(Processing Flowchart)

Figure 3:
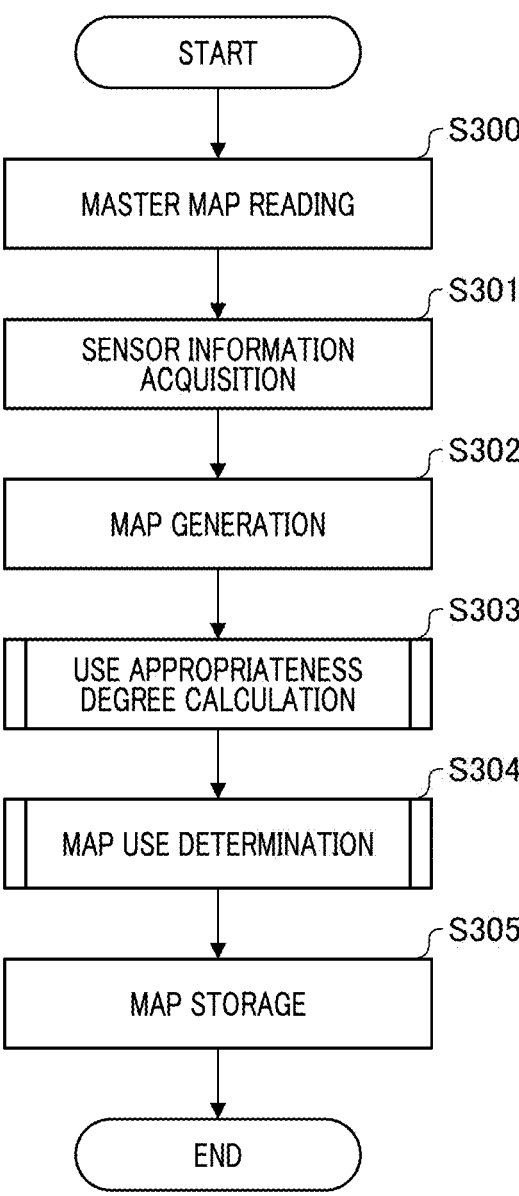
FIG. 3 is a flowchart of processing according to a first embodiment.

FIG. 3 is a flowchart of processing according to a first embodiment. FIG. 3 is used to show the processing steps of the information processing apparatus 201 in the first embodiment. Each process that is shown in the flowchart is realized by the CPU 101 executing a control program. A map updating procedure when a moving body on which the information processing apparatus 201 is mounted performs cyclic traveling and the information processing apparatus 201 newly generates a map is explained with reference to the flowchart of FIG. 3.

In step S300, the information processing apparatus 201 reads the master map from the RAM 103 as post-startup initialization processing. The information processing apparatus 201 performs position and/or orientation measurement by using this master map and performs cyclic traveling. The following steps are steps for performing the map generation during the performing of the cyclic traveling of the moving body.

In step S301, the sensor information acquisition unit 203 acquires a sensing result by using the sensor module 202.

In step S302, the map generation unit 204 generates map data. Specifically, the map generation unit 204 collects stereo camera images from the sensor information acquisition unit 203 continuously in time series, and the three-dimensional position information group of the feature points of an object that is calculated from the captured image data is made the map data. The feature points can be calculated by any method that allows for the calculation of feature points in image data. For example, there is a method in which a SUSAN operator is used (S. M. Smith and J. M. Brady, "SUSAN—a new approach to low level image processing," Int'l J Computer Vision, vol. 23, no. 1, pp. 45-78, 1997). SUSAN is an abbreviation for Smallest Univalue Segment Assimilating Nucleus. In addition to this, the calculation may be performed based on a three-dimensional feature amount, such as a SHOT feature amount, from a plurality of image data and feature points. SHOT is an abbreviation for Signature of Histograms of OriginTations.

In step S303, the use appropriateness degree calculation unit 205 calculates the use appropriateness degree of the map data that was generated in step S302. Specifically, the use appropriateness degree calculation unit 205 calculates an average value obtained by dividing the number of feature points that are included in the map data generated in step S302 by the number of image capturing frames that were used in the map generation as the use appropriateness degree, and holds the calculated value in the RAM 103.

In step S304, the map use determination unit 206 performs a determination as to which map of the map data that is used for the current cyclic traveling or the map data that was acquired in step S302 is used for the next and subsequent cyclic traveling. Specifically, if it is determined that the use appropriateness degree that was calculated in step S303 is greater than a predetermined threshold value, it is determined that the map that was generated in step S302 is to be replaced as the master map.

In step S305, the storage unit 207 performs storage processing of the map data based on the determination result of step S304. That is, in a case in which the determination result of step S304 is "use (the map that was generated in step S302) as the master map", the map data that was generated in step S302 is replaced in the external memory 104 as the master map data.

As explained in the above, in the present embodiment, whether or not the master map can be stored is determined by using the use appropriateness degree of the map. Thereby, it is possible to maintain a high accuracy of the position and/or orientation measurement at the time of the next and subsequent cyclic traveling.

Note that in the present embodiment, in step S301 in FIG. 3, although an example in which a stereo camera is used as the sensor module 202 was explained, the present invention is not limited thereto, and a monocular camera may be used. In addition, a configuration in which a ToF sensor, a LiDAR sensor, or the like is used in combination with the sensor module 202 may be employed. In that case, the difference between the distances of the distance information that was acquired by using the ToF sensor value or the LiDAR sensor value and the distance information from the feature point that was captured by the stereo camera are compared, and in a case in which a difference is detected, a subtraction of the use appropriateness degree is performed assuming that the reliability degree of the map has decreased. In addition, in a case in which a forward body is recognized from distance information that was acquired from a ToF sensor value or a LiDAR sensor value, and the body is not captured by the stereo camera, an addition of the use appropriateness degree is performed assuming that the reliability degree of the map has increased. The addition/subtraction value may be a fixed value, or it may take the number of detected differences between the distance information captured by the ToF sensor value or LiDAR sensor and the distance information from the feature point that was captured by the stereo camera, and add/subtract the product of the difference and a predetermined coefficient.

Modification Example 1 of the First Embodiment

In the present embodiment, an example in which the average value of the number of feature points is used with respect to the use appropriateness degree that is calculated in step S303 was shown. Hereinafter, as a modification example, a method of determining the use appropriateness degree based on the average value of the number of feature points and the distribution state of the feature points will be explained.

Figure 4:
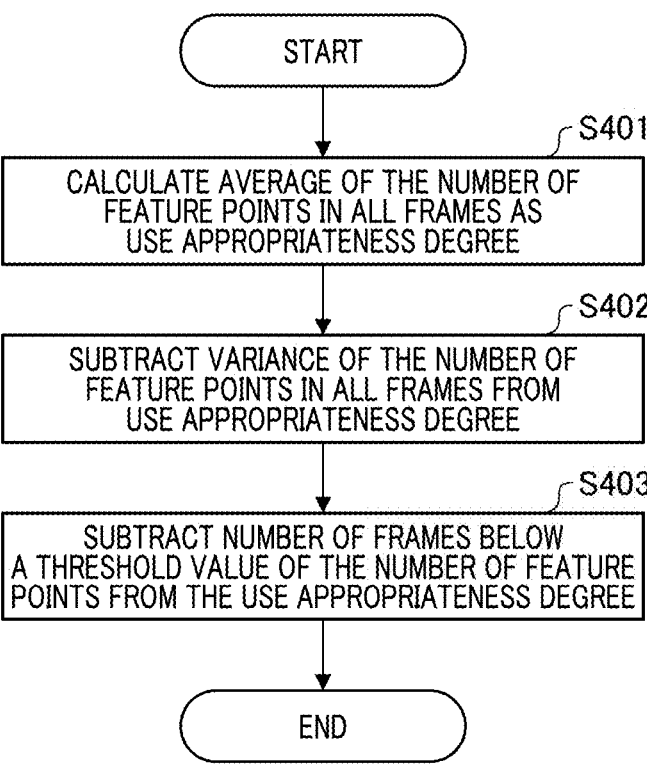
FIG. 4 is a flowchart showing a method for calculating the use appropriateness degree in Modification Example 1 of the first embodiment.

The processing of Modification Example 1 of the first embodiment is different from that of the first embodiment only in the processing in step S303. That is, the method of calculating the use appropriateness degree is different. FIG. 4 is a flowchart showing a method for calculating the use appropriateness degree in Modification Example 1 of the first embodiment. A method of calculating the use appropriateness degree of the map data in step S303 by the use appropriateness degree calculation unit 205 in the present modification example will be explained with reference to FIG. 4.

The use appropriateness degree calculation unit 205 calculates the use appropriateness degree by using the map that was generated in step S302.

In step S401, the use appropriateness degree calculation unit 205 calculates as the use appropriateness degree an average value that can be obtained by dividing the sum of the number of feature points that are included in the map data that was generated in step S302 by the number of image capturing frames that were used in the map generation. The use appropriateness degree calculation unit 205 holds the calculated value in the RAM 103.

In step S402, the use appropriateness degree calculation unit 205 calculates the variance of the number of feature points of each image capturing frame that was used in the map generation that was generated in step S302, and subtracts the number that is obtained by multiplying the variance value by a predetermined coefficient from the use appropriateness degree.

In step S403, the use appropriateness degree calculation unit 205 subtracts from the appropriateness degree a value that is obtained by multiplying the number of frames in which the number of feature points falls below a predetermined threshold value among the image capturing frames that were used in the map generation that was generated in step S302 by a predetermined coefficient.

In this manner, it is possible to avoid a phenomenon in which an uneven distribution in the feature point number among the frames is detected, and although the use appropriateness degree is high, a large number of frames having few feature points are distributed. Thereby, the information processing apparatus 201 can maintain the accuracy of the position and/or orientation measurement by comparing the use appropriateness degree.

Note that, in Modification Example 1 of the first embodiment, although an example in which the flow from step S401 to S403 is used has been explained, not all of the steps are necessarily required. For example, a step including any of the steps from step S401 to 403 may be executed.

Note that, in step S401 of Modification Example 1 of the first embodiment, although the sum of the number of feature points included in the map data was divided by the number of image capturing frames that were used in the map generation, the present invention is not limited thereto. In step S401, at least the use appropriateness degree calculation unit 205 may calculate the use appropriateness degree based on the number of feature points in image data of a plurality of frames that were used in the generation of the map data. For example, the use appropriateness degree calculation unit 205 may calculate the use appropriateness degree based on the sum of the feature points in image data of a plurality of frames. In addition, the use appropriateness degree calculation unit 205 may calculate the use appropriateness degree based on any of the average value, the median value, or the mode value of the feature points in image data of a plurality of frames. In addition, in image data of a plurality of frames, in a case in which the number of feature points has fallen below a set threshold value, the use appropriateness degree may be subtracted.

Note that, in step S402 of the Modification Example 1 of the first embodiment, although the variance was used to subtract the use appropriateness degree, the present invention is not limited thereto, and the variance may be used for the map use determination. For example, first, the use appropriateness degree calculation unit 205 calculates the variance of the use appropriateness degree of use of the newly generated map data and the variance of the use appropriateness degree of the master map data. Then, in a case in which the map use determination unit 206 determines that the variance of the use appropriateness degree of the newly generated map data is smaller than the variance of the use appropriateness degree of the master map data, it is determined that the newly generated map data is used for the position and/or orientation measurement.

Note that, in step S403 of Modification Example 1 of the first embodiment, although a threshold value of the use appropriateness degree was used for subtraction of the use appropriateness degree, the present invention is not limited thereto, and a threshold value of the user appropriateness degree may be used in map use determination. For example, the newly generated map data and the master map data are generated by using image data of a plurality of frames. The use appropriateness degree calculation unit 205 calculates, for each frame, whether the use appropriateness degree of the image data is smaller than a predetermined threshold value. The map use determination unit 206 compares the number of frames in which the use appropriate degree related to the master map data is lower than a predetermined threshold value with the number of frames related to the newly generated map data and frames in which the use appropriateness degree is lower than a predetermined threshold value. Here, in a case in which the number of frames that are lower than the above-described threshold value related to the newly generated map data is smaller than the number of frames that are lower than the above-described threshold value related to the master map data, the map use determination unit 206 determines that the newly generated map data is used in the position and/or orientation measurement.

Note that the threshold value does not necessarily have to be made as a reference, and for example, the number of frames in which the use appropriateness degree is the lowest may be compared, and the map data having the smaller number of frames in which the use appropriateness degree is the lowest may be used for the position and/or orientation measurement.

Modification Example 2 of the First Embodiment

In the above-described present embodiment, in the determination of the use appropriateness degree, the number of occurrences of whiteout pixels may be taken into account. A whiteout pixel is a pixel in which the luminance value is equal to or greater than a predetermined value. In Modification Example 2 of the first embodiment, the use appropriateness degree of the map is determined based on the generation amount of whiteout pixels in the captured image that are inappropriate for map generation. Specifically, an amount that is proportional to the number of whiteout pixels in the image used in the map creation is subtracted from the use appropriateness degree.

In addition, in the determination of the use appropriateness degree, the generated number of blackout pixels, rather than whiteout pixels, may be taken into account. A blackout pixel is a pixel in which the luminance value is less than a predetermined value. Specifically, in the determination of the use appropriateness degree, an amount that is proportional to the number of blackout pixels is subtracted from the use appropriateness degree.

In addition, in the determination of the use appropriateness degree, the influence of the feature amount of the movable image capturing target may be taken into account. Specifically, by using a recognition technology such as Deep Learning and the like, it is determined as to whether or not an object in the image is a movable object, and an amount that is proportional to the number of detections of the movable object is subtracted from the use appropriateness degree. In contrast, even if an object is movable, an object of which the size is less than a predetermined threshold value may not be an adjustment target for the use appropriateness degree. In this manner, in a case in which an object in image data of a plurality of frames that generate the map data is a movable object, the use appropriateness degree is subtracted. In addition, the use appropriateness degree may be calculated based on the number of non-moving objects in image data of a plurality of frames that generate the map data.

In this manner, in Modification Example 2 of the first embodiment, in the determination of the use appropriateness degree, the influence of a feature amount of a problem in image capture, such as whiteout or blackout, or the influence of a feature amount of the movable image capturing object is included. Thereby, it is possible to maintain the accuracy of the position and/or orientation measurement.

Modification Example 3 of the First Embodiment

In the present embodiment described above, in step S302 in FIG. 3, the map data generation method in which the feature point information is held is shown. In Modification Example 3 of the first embodiment, a map generation time is added to the map data. Thereby, a master map can be provided in each time period. In the present modification example, a map use method that is based on time information will be explained. Note that in the present embodiment, the CPU 101 functions as a time period acquisition unit that acquires a time period.

In step S302, the map generation unit 204 generates the map data. At that time, the map generation unit 204 adds the date and time and the day of the week when the map was generated to the map data as meta information. In step S305, the storage unit 207 stores the map data to which the meta information has been added in the external memory 104.

When a moving body on which an information processing apparatus 201 is mounted performs cyclic traveling, the map data is called from the external memory 104. At this time, the map data that was generated during the same time period or on the same day of the week from the time of performing the cyclic traveling is written to the RAM 103 as a master map. The information processing apparatus 201 uses the map data that was suitable at the time of cyclic traveling as a master map. Thereby, it is possible to maintain the accuracy of position and/or orientation measurement with respect to map information having a feature such as time or day of the week.

Modification Example 4 of the First Embodiment

In Modification Example 3, the map data use method of selecting map data in the same time period was shown. In contrast, regardless of the time period, the feature state specifically changes depending on the illumination conditions. Therefore, in Modification Example 4 of the first embodiment, a map use method that is based on the illumination conditions will be explained.

In step S302, the map generation unit 204 generates map data. At that time, the map generation unit 204 adds the illumination conditions at the time at which the map was generated to the map data as meta information. In step S305, the storage unit 207 stores in the external memory 104 the map data to which the illumination conditions were added as meta information. An illumination condition is, for example, an illumination state of each illumination fixture. By using the communication I/F 107, the map generation unit 204 acquires an illumination state from each of the illumination fixtures, and specifies the illumination conditions. Thereby, it is possible to add various illumination conditions to the map data, such as a state in which there is full illumination or a state in which individual points of illumination are turned off.

When a moving body on which an information processing apparatus 201 is mounted performs cyclic traveling, the map data is called from the external memory 104. At this time, the map data that was generated under the same illumination conditions from the illumination conditions at the time of the cyclic traveling is written to the RAM 103 as a master map. The information processing apparatus 201 uses the map data that was suitable at the time of cyclic traveling as a master map. Thereby, it is possible to maintain the accuracy of the position and/or orientation measurement with respect to the map information having a feature in the illumination conditions.

Note that, in order to acquire the illumination conditions, the open/close state of a blind that was installed in a window may be held in association with the map data. Alternatively, a sensor that is capable of measuring brightness, such as an illuminance sensor, may be provided in a space of a map generation target, and the measurement value of the sensor may be held in association with the map data.

Modification Example 5 of the First Embodiment

In the present embodiment described above, in step S304, in a case in which the use appropriateness degree of the map that was created in step S302 is greater than a predetermined threshold value, in step S305, a method of replacing the map as the master map was explained. In Modification Example 5 of the first embodiment, the current master map is compared with the map that was created in step S302, and a map having a higher use appropriateness degree is used as the master map. Thereby, before and after the replacement of the master map, it is possible to maintain the accuracy of the position and/or orientation measurement.

Second Embodiment

Hereinafter, a second embodiment of the present invention will be explained. Configurations that are the same as those described above are represented by the same reference numerals and the explanations thereof will be omitted. The hardware configuration diagram, the functional configuration diagram, the overall processing flow, the map use determination processing flow, and the use appropriateness degree calculation flow in the second embodiment are same as those in FIG. 1 through FIG. 4.

In the first embodiment, in the map use determination of step S304, a method was shown in which whether the use appropriateness degree of the newly generated map exceeds a predetermined threshold value is used as a map use determination condition. In a second embodiment, it is determined that the master map is replaced in a case in which the use appropriateness degree of the newly generated map exceeds the predetermined threshold value and exceeds the use appropriateness degree with the existing master map. Thereby, it is possible to leave map data having a better use appropriateness degree as a master map. In addition, it is possible to improve the map accuracy each time a moving body on which the information processing apparatus 201 is mounted updates the master map, and to maintain the accuracy of the position and/or orientation measurement.

Figure 5:
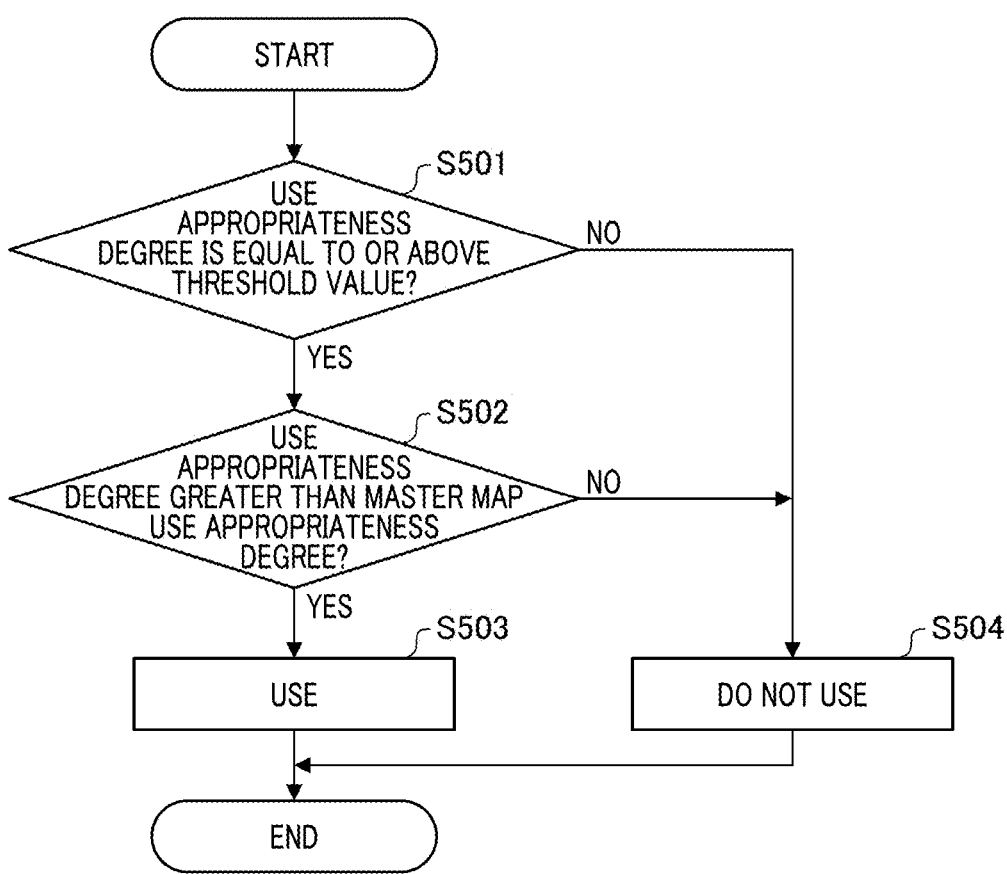
FIG. 5 is a flowchart of a map use determination processing according to a second embodiment.

Hereinafter, the detailed processing of step S304, which differs from the first embodiment, will be described. FIG. 5 is a flowchart of a map use determination processing (step S304) according to a second embodiment.

In step S501, the map use determination unit 206 determines whether the use appropriateness degree exceeds a preset threshold value. When the map use determination unit 206 determines that the use appropriateness degree is equal to or above the threshold value, the processing transitions to step S502. In contrast, if the map use determination unit 206 determines that the use appropriateness degree is less than the threshold value, the processing transitions to step S504. In step S504, the map use determination unit 206 determines that the map generated in step S302 is not used in the next and subsequent cyclic traveling and terminates the map use determination. The processing is similar in a case in which a subsequent processing transitions to step S504.

In step S502, in a case in which the use appropriateness degree of the newly generated map in step S303 is equal to or smaller than the use appropriateness degree of the master map, the map use determination unit 206 transitions to step S504 and terminates the process. In addition, in a case in which the use appropriateness degree of the map is greater than that of the master map, the processing transitions to step S503, and it is determined that the map is used.

As explained above, in the present embodiment, after the use appropriateness degree of the newly generated map is determined to be equal to or greater than a predetermined threshold value, the use appropriateness degree of the existing master map and the newly created map data are further compared. Thereby, it is possible to select a map having a higher use appropriateness degree than the previous map, and to maintain the accuracy of the position and/or orientation measurement.

Modification Example 1 of the Second Embodiment

In step S303, the use appropriateness degree calculation unit 205 generates each of the use appropriateness degree for the entire map data that was generated in step S302, and the use appropriateness degree of a range in which the entire map data is segmented into small ranges (segment ranges). Here, the use appropriateness degree of each part of the entire map data that has been segmented into small ranges is referred to as a "partial use appropriateness degree".

By using the method that was explained in the first embodiment, the use appropriateness degree calculation unit 205 calculates each of the partial use appropriateness degrees with respect to the map data for each segment range among the map data. This is repeated, and the use appropriateness degree calculation unit 205 acquires a partial use appropriateness degree for all map data parts.

Figure 6:
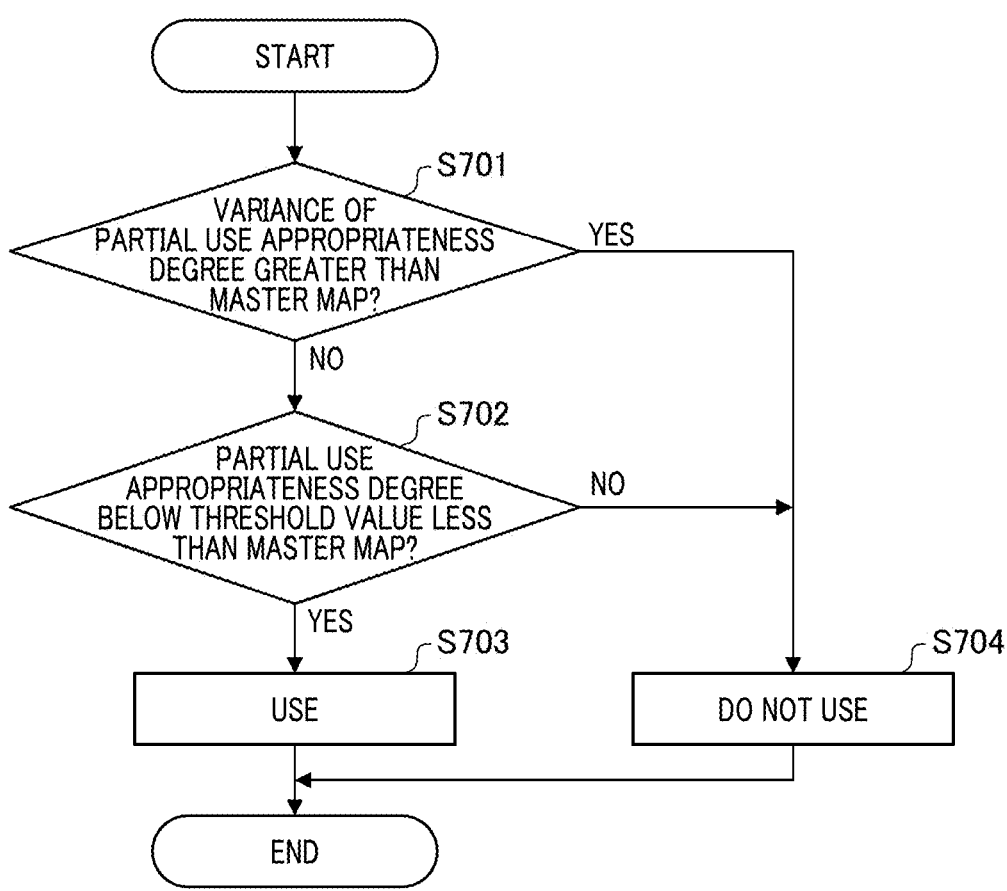
FIG. 6 is a flowchart of a map use determination processing according to Modification Example 1 of the second embodiment.

Hereinafter, the detailed processing of step S304, which differs from the second embodiment, will be described. FIG. 6 is a flowchart of a map use determination processing (step S304) according to Modification Example 1 of the second embodiment.

In step S701, the map use determination unit 206 determines the variance of the partial use appropriateness degree of each of the master map and the map that was generated in step S302. In a case in which it has been determined that variance of the map that was generated in step S302 is larger than the variance of the master map, the processing transitions to step S702. In contrast, in a case in which it has been determined that the variance of the map that was generated in step S302 is larger than the variance of the master map, the processing transitions to step S704, and the processing is terminated.

In step S702, the map use determination unit 206 calculates the number of partial use appropriateness degrees that have a value that is an equal value to or is a value that is under the threshold value (a value equal to or less than a threshold value) with respect to the master map and the partial use appropriateness degree of the map that was generated in step S302. Here, in a case in which the number of partial use appropriateness degrees that are equal to or less than the threshold value is smaller in the map that was generated in step S302, the processing transitions to step S703. In contrast, in a case in which the number of partial use appropriateness degrees that are equal to or less than the threshold value is not smaller in the map that was generated in step S302, the processing transitions to step S704.

In step S703, the map that was generated in step S302 is selected as the master map that is used the next time and subsequently. Then, the processing is terminated.

In step S704, it is determined that the map that was generated in step S302 is not used as the master map that is used the next time and subsequently. Then, the processing is terminated.

As explained above, in the Modification Example 1 of the second embodiment, the partial use appropriateness degree of the existing master map is compared with the partial use appropriateness degree of the newly created map data. Thereby, it is possible to select a map in which locality is eliminated. Thereby, it is possible to maintain the accuracy of the position and/or orientation measurement.

Note that, in the present modification example, although the map use determination unit 206 determined whether or not to use the map as the master map based on the variance of the partial use appropriateness degree, the present invention is not limited thereto. For example, the use appropriateness degree calculation unit 205 calculates the number of parts of the map data for which the partial use appropriateness degree is less than a predetermined value, and calculates a ratio with respect to the number of all parts of the map data of that number. Then, the map use determination unit 206 may compare the ratio of the respective map data and determine whether or not to use the map data as the master map.

In addition, the method of map use availability determination that used the use appropriateness degree shown in steps S501 to S502 of FIG. 5 of the second embodiment and the steps shown in FIG. 6 of the Modification Example 1 may be used in combination. In addition, the map use determination method in step S304 that is shown in FIG. 5 may not include step S502.

Third Embodiment

Hereinafter, a third embodiment of the present invention will be explained. Configurations the same as those described above are represented by the same reference numerals and will be omitted from explanation. The hardware configuration diagram, the functional configuration diagram, the overall processing flow, the map use determination processing flow, and the use appropriateness degree calculation flow in the third embodiment are the same as those in FIG. 1 through FIG. 5.

In the first embodiment and the second embodiment, various map use determination methods using the use appropriateness degree or the partial use appropriateness degree were shown in the map use determination of step S304. In the third embodiment, a method of visualizing the spatial distribution of the use appropriateness degree that was calculated by the use appropriateness degree calculation unit 205 and presenting it to a user will be explained. According to this method, it is possible for the user to determine whether or not the use appropriateness degree of a region in which the necessity to stably move the moving body is high is sufficient.

Figure 7:
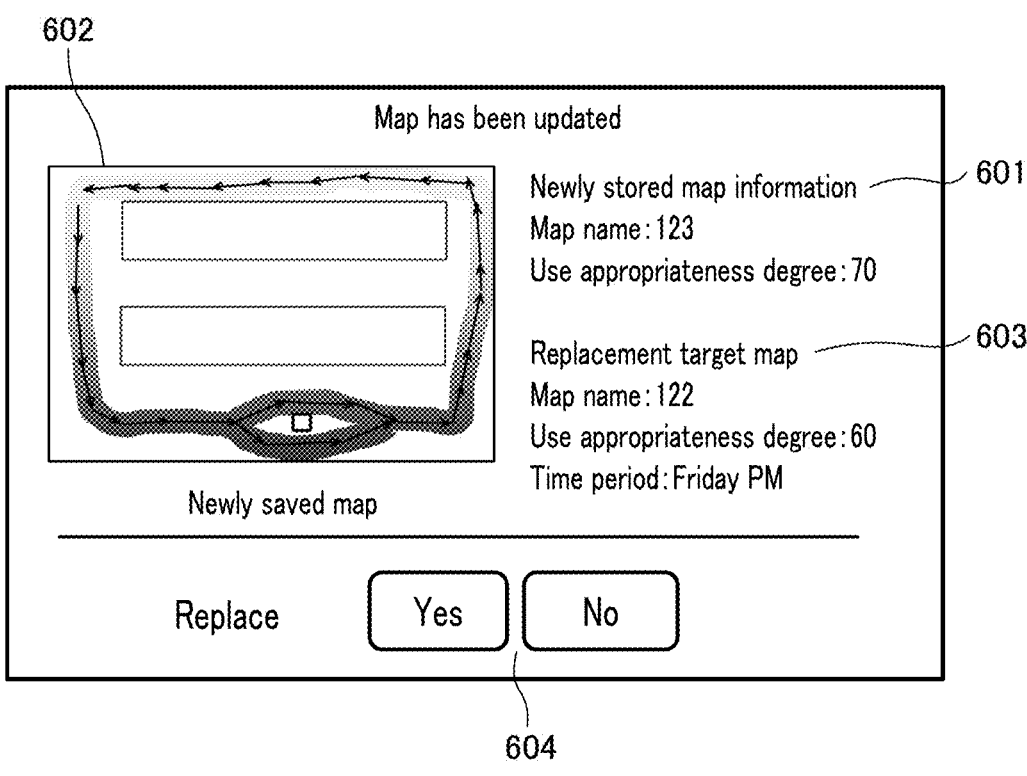
FIG. 7 is a display screen that is displayed in the map use determination processing according to a third embodiment.

Hereinafter, the detailed processing of step S304, which differs from the first embodiment and the second embodiment, will be described. With reference to FIG. 7, a method for implementing the determination method based on the screen input in the map use determination in step S304 will be explained. FIG. 7 is an example of a display screen that is displayed in the map use determination processing (step S304) in the third embodiment. However, the screen display method shown in FIG. 7 is simply an example, and the technical scope of the present invention is not limited to this screen display method. Note that the application location of the screen input step that is shown in FIG. 7 may be at any time point of step S304, and may be, for example, at any time point in FIG. 5.

In step S304 of the third embodiment, the map use determination unit 206 displays a screen as shown in FIG. 7 on the display unit 106. The screen that is shown in FIG. 7 is a screen configured to notify the user of the various types of information of the map information that was generated in step S302 and whether or not to replace the map with the master map. Note that this screen is a liquid crystal touch panel, and the display unit 106 also serves as the input unit 105. Next, the various types of information that are shown in FIG. 7 will be explained.

Information 601 shows the various types of map information that was generated in step S302. As the display content, this includes the map name and use appropriateness degree of the generated map. The information 601 is map information that is a new storage target and is information for the user to determine whether or not to replace the master map.

The route image 602 is the map information generated in step S302 drawn as a route diagram. The route image 602 includes, together with the route information, the number of feature points in the stereo image on the route expressed by the density of the filled color. That is, it shows that the number of feature points in the route in the dark portion of the route image 602 is large, and the number of feature points in the route in the light portion of the route image 602 is small.

Information 603 shows various types of information of the master map. The map name and use appropriateness degree, and further, the time period of the target to be a master map, are clearly indicated. For comparison, the information 603 includes content (map name, use appropriateness degree) that corresponds to the information 601.

A display 604 is a display that asks the user whether or not replacement is possible, and functions as a button. When the map use determination unit 206 detects that "Yes" was pressed in the display 604 of the content asking the user about replacement, it determines that the user applies the newly stored map as the master map.

As explained above, in the third embodiment, the map use appropriateness degree is disclosed by using the display unit 106 in the determination of the use of the map. A method for acquiring an instruction of availability from the user by screen input has been shown. Thereby, the user intention can be reflected in the master map storage availability determination, and the accuracy of the position and/or orientation measurement at the time of the next and subsequent cyclic traveling can be maintained.

Modification Example 1 of the Third Embodiment

In the third embodiment, a map replacement method that used the screen of FIG. 7 was shown. In the example of FIG. 7, an example in which the use appropriateness degree and time period are presented on the screen was shown, but the present invention is not limited thereto. For example, other information may be presented on the screen, such as the variance state of the feature points that were explained in step S402 or the number of frames having feature points below the threshold value that was explained in step S403. In addition, information that is acquired by another information processing apparatus 201 may be presented on the screen. Thereby, the user intention can be further reflected in the master map setting, and the accuracy of the position and/or orientation measurement can be maintained under the environmental conditions of each user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, in the above described embodiments, the present invention was explained as an information processing apparatus 201, but the present invention is not limited thereto. For example, it may be configured to perform measurement of a position or an orientation in a position and/or orientation measurement unit mounted on a moving body by using the map data of the information processing apparatus 201. In addition, the present invention may be a moving body provided with a moving unit that moves based on the map data of the information processing apparatus 201.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-011627, filed Jan. 28, 2022, which is hereby incorporated by reference wherein in its entirety.

What is claimed is:

1. An information processing apparatus comprising:
   a memory storing instructions; and
   a processor executing the instructions to thereby cause the information processing apparatus to:
      acquire sensor information from a sensor mounted on a moving body,
      generate map data based on the sensor information,
      calculate a use appropriateness degree of the map data based on at least one of the sensor information and the map data,
   determine whether or not to use the map data in a position and/or orientation measurement of the moving body that is based on the use appropriateness degree,
   acquire first sensor information from the sensor based on the pre-stored first map data, and
   generate second map data based on the first sensor information, and

wherein the first map data and the second map data are generated by using image data of a plurality of frames,
   wherein the processor is further configured to calculate for each frame whether the use appropriateness degree of the image data is less than a predetermined threshold value, and
   wherein, in a case in which the number of frames that are used to generate the second map data for which the use appropriateness degree is less than the predetermined threshold value is less than the number of frames that are used to generate the first map data for which the use appropriateness degree is less than the predetermined threshold value, determine that the second map data is used for position and/or orientation measurement, and
   wherein the processor is further configured to control traveling of the moving body using the second map data after determining that the second map data is used for position and/or orientation measurement and to continue controlling traveling of the moving body using the first map data after determining that the second map data is not used for position and/or orientation measurement.

2. The information processing apparatus according to claim 1, wherein the processor is further configured to, in a case in which the use appropriateness degree of the second map data is determined to be greater than that of the first map data, determine that the second map data is used for position and/or orientation measurement.

3. The information processing apparatus according to claim 2, wherein the processor is further configured to, in a case in which it is not determined that the use appropriateness degree of the second map data is greater than the use appropriateness degree of the first map data, determine that the first map data is used for position and/or orientation measurement.

4. The information processing apparatus according to claim 1, wherein the processor is further configured to, in a case in which a use appropriateness degree of the second map data is greater than a predetermined threshold value, determine that the second map data is used for position and/or orientation measurement.

5. The information processing apparatus according to claim 1, wherein the processor is further configured to, in a case in which the variance of a use appropriateness degree of the second map data is determined to be smaller than the variance of a use appropriateness degree of the first map data, determine that the second map data is used for position and/or orientation measurement.

6. The information processing apparatus according to claim 5, wherein the processor is further configured to:
   calculate the use appropriateness degree for each part of first map data and second map data, and
   in a case in which it was determined that the variance of the use appropriateness degree for each part of the second map data is smaller than the variance of the use appropriateness degree for each part of the first map data, determine that the second map data is used for position and/or orientation measurement.

7. The information processing apparatus according to claim 1, wherein the processor is further configured to execute the instructions causing the information processing apparatus to acquire a time period when the map data was acquired, and
   wherein the processor is further configured to determine whether or not to use the map data for position and/or orientation measurement in each of time periods.

8. The information processing apparatus according to claim 7, wherein the processor is further configured to, in a case in which the first map data and the second map data were generated during the same time period, calculate the use appropriateness degree.

9. The information processing apparatus according to claim 1, wherein the processor is further configured to execute the instructions causing the information processing apparatus to perform position and/or orientation measurement based on the map data.

10. The information processing apparatus according to claim 1, wherein the processor is further configured to calculate the use appropriateness degree based on the number of feature points in image data of a plurality of frames that were used for generation of the map data.

11. The information processing apparatus according to claim 10, wherein the processor is further configured to calculate the use appropriateness degree based on the sum of feature points in image data of the plurality of frames.

12. The information processing apparatus according to claim 10, wherein the processor is further configured to calculate the use appropriateness degree based on any of the average value, the median value, and the mode value of feature points in image data of the plurality of frames.

13. The information processing apparatus according to claim 10, wherein the processor is further configured to, in a case in which an object in image data of the plurality of frames was a movable object, subtract the use appropriateness degree.

14. The information processing apparatus according to claim 10, wherein the processor is further configured to, in image data of the plurality of frames, in a case in which a number of feature points has fallen below a predetermined threshold value, subtract the use appropriateness degree.

15. The information processing apparatus according to claim 10, wherein the processor is further configured to, in image data of the plurality of frames, as the number of whiteout pixels or blackout pixels increases, subtract the use appropriateness degree.

16. The information processing apparatus according to claim 1, wherein the processor is further configured to calculate the use appropriateness degree based on a number of non-moving objects in each of the first map data and the second map data.

17. The information processing apparatus according to claim 1, wherein the processor executes the instructions causing the information processing apparatus to:

enter a user instruction, calculate a use appropriateness degree of the first map data and the use appropriateness of the second map data, display a use appropriateness degree of the first map data and the use appropriateness degree of the second map data, and determine which of the first map data or the second map data is used for position and/or orientation measurement based on an input.

18. The information processing apparatus according to claim 1, wherein the processor is further configured to segment a traveling route of the moving body and to select the use of either the first map data or the second map data for each segment based on the use appropriateness for each segment.

19. A moving body comprising:

a moving unit, an information processing apparatus comprising:

a memory storing instructions; and a processor executing the instructions to thereby cause the information processing apparatus to:

acquire sensor information from a sensor mounted on a moving body, generate map data based on the sensor information, calculate a use appropriateness degree of the map data based on at least one of the sensor information and the map data, determine whether or not to use the map data in a position and/or orientation measurement of the moving body that is based on the use appropriateness degree, acquire first sensor information from the sensor based on the pre-stored first map data, and generate second map data based on the first sensor information, and wherein the first map data and the second map data are generated by using image data of a plurality of frames, and wherein the processor is further configured to calculate for each frame whether the use appropriateness degree of the image data is less than a predetermined threshold value, and wherein, in a case in which the number of frames that are used to generate the second map data for which the use appropriateness degree is less than the predetermined threshold value is less than the number of frames that are used to generate the first map data for which the use appropriateness degree is less than the predetermined threshold value, determine that the second map data is used for position and/or orientation measurement, and wherein the processor is further configured to control traveling of the moving body using the second map data after determining that the second map data is used for position and/or orientation measurement and to continue controlling traveling of the moving body using the first map data after determining that the second map data is not used for position and/or orientation measurement.

20. An information processing method, the method comprising:

a sensor information acquisition step of acquiring sensor information from a sensor mounted on a moving body, a map generation step of generating map data based on the sensor information, a use appropriateness degree calculation step of calculating the use appropriateness degree of the map data based on at least one of the sensor information and the map data, and a map use determination step of determining whether or not to use the map data in position and/or orientation measurement of the moving body based on the use appropriateness degree, a first sensor information acquisition step of acquiring first sensor information from the sensor based on the pre-stored first map data, and a second map data generation step of generating second map data based on the first sensor information, wherein the first map data and the second map data are generated by using image data of a plurality of frames, wherein the method further comprises to a step of calculating for each frame whether the use appropriateness degree of the image data is less than a predetermined threshold value, and wherein, in a case in which the number of frames that are used to generate the second map data for which the use appropriateness degree is less than the predetermined threshold value is less than the number of frames that are used to generate the first map data for which the use appropriateness degree is less than the predetermined threshold value, determine that the second map data is used for position and/or orientation measurement, and wherein the method further comprises controlling travel of the moving body using the second map data after determining that the second map data is used for position and/or orientation measurement and controlling travel of the moving body using the first map data after determining that the second map data is not used for position and/or orientation measurement.

21. A non-transitory storage medium on which is stored a computer program related to a method for controlling an information processing apparatus, the method comprising:
    a sensor information acquisition step of acquiring sensor information from a sensor mounted on a moving body,
    a map generation step of generating map data based on the sensor information,
    a use appropriateness degree calculation step of calculating the use appropriateness degree of the map data based on at least one of the sensor information and the map data, and a map use determination step of determining whether or not to use the map data in position and/or orientation measurement of the moving body based on the use appropriateness degree,
    a first sensor information acquisition step of acquiring first sensor information from the sensor based on the pre-stored first map data, and
    a second map data generation step of generating second map data based on the first sensor information,
    wherein the first map data and the second map data are generated by using image data of a plurality of frames,
    wherein the method further comprises to a step of calculating for each frame whether the use appropriateness degree of the image data is less than a predetermined threshold value, and
    wherein, in a case in which the number of frames that are used to generate the second map data for which the use appropriateness degree is less than the predetermined threshold value is less than the number of frames that are used to generate the first map data for which the use appropriateness degree is less than the predetermined threshold value, determine that the second map data is used for position and/or orientation measurement, and
    wherein the method further comprises controlling travel of the moving body using the second map data after determining that the second map data is used for position and/or orientation measurement and controlling travel of the moving body using the first map data after determining that the second map data is not used for position and/or orientation measurement.

* * * * *